June 29, 1926.
L. KRUPP
TRANSMISSION
Filed Sept. 5, 1925
1,590,949
3 Sheets-Sheet 2
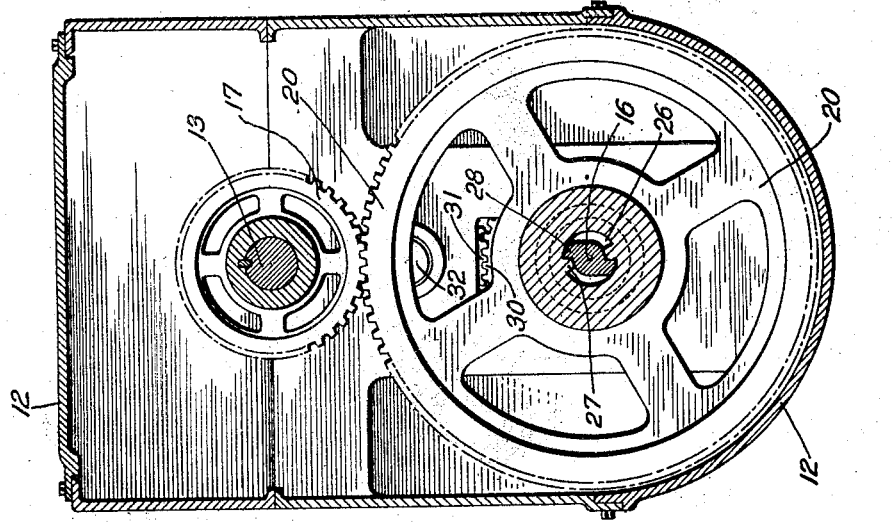
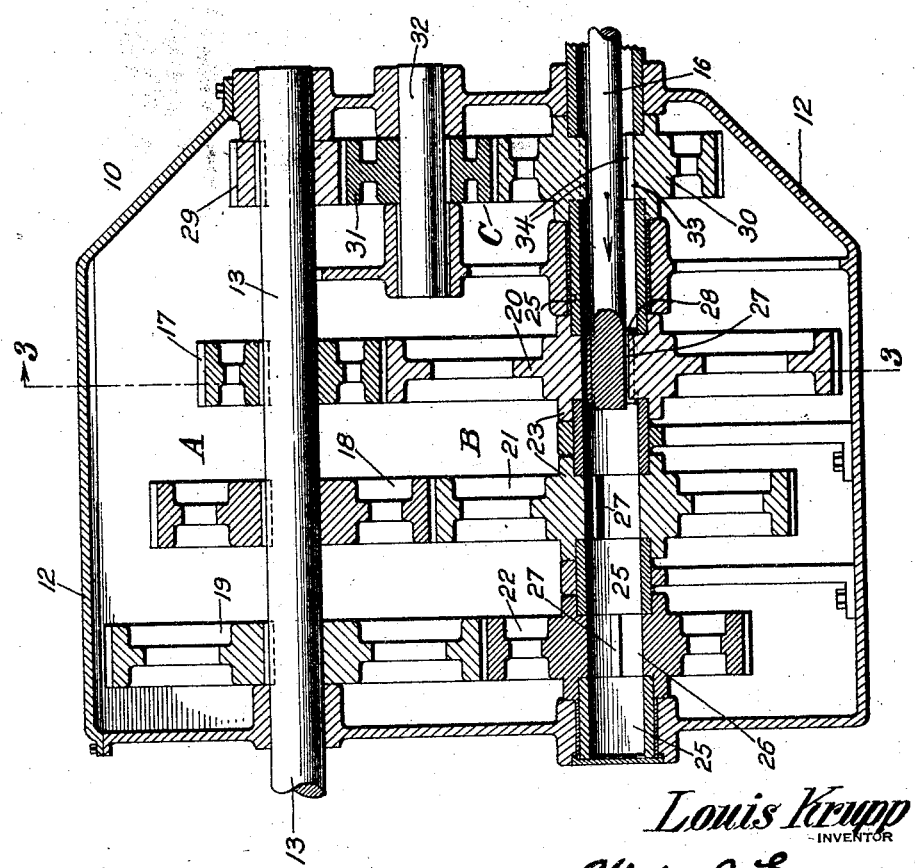
Louis Krupp
INVENTOR
BY Victor J. Evans
ATTORNEY June 29, 1926.
L. KRUPP
1,590,949
TRANSMISSION
Filed Sept. 5, 1925   3 Sheets-Sheet 3
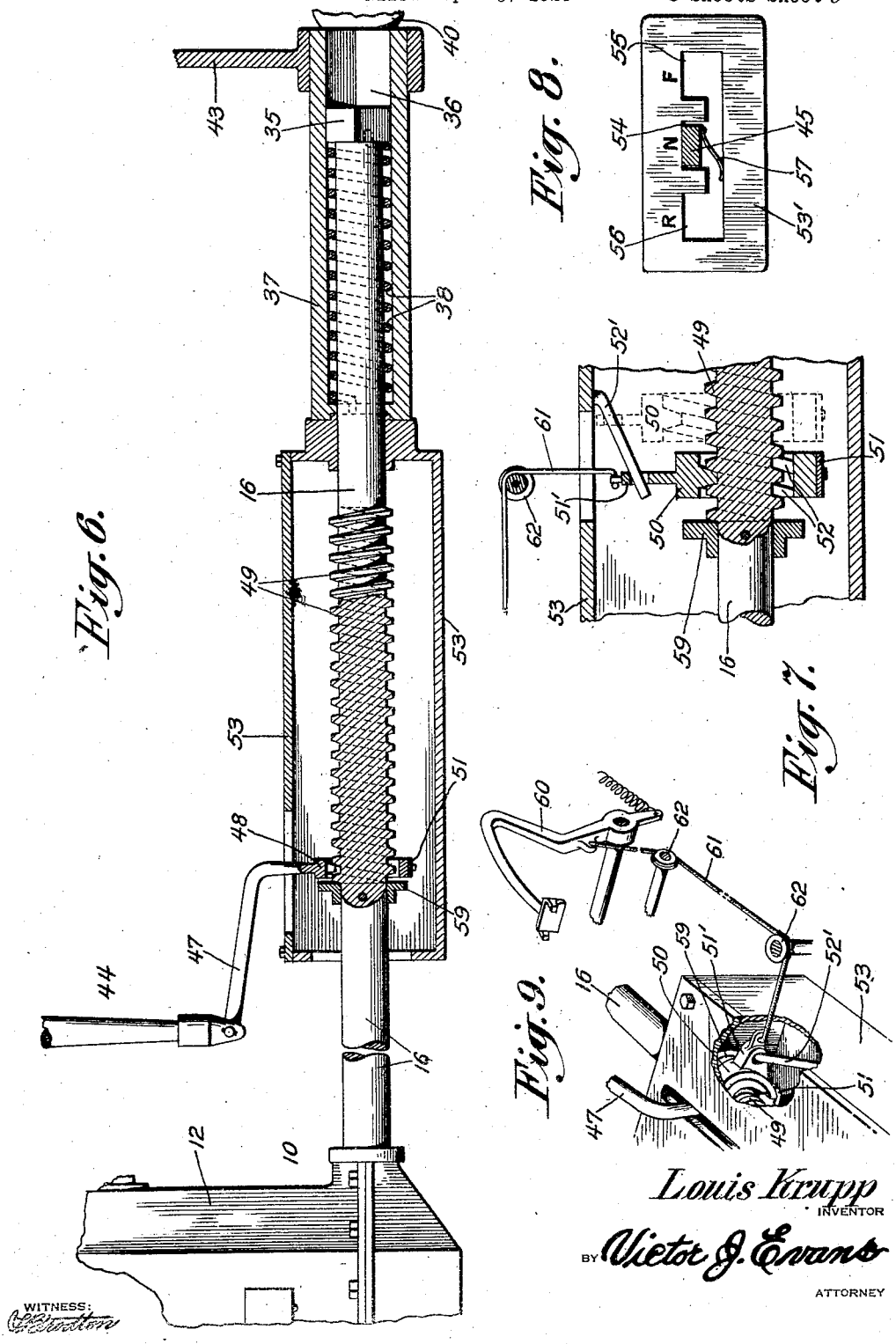
Louis Krupp
INVENTOR
BY Victor J. Evans
ATTORNEY Patented June 29, 1926.

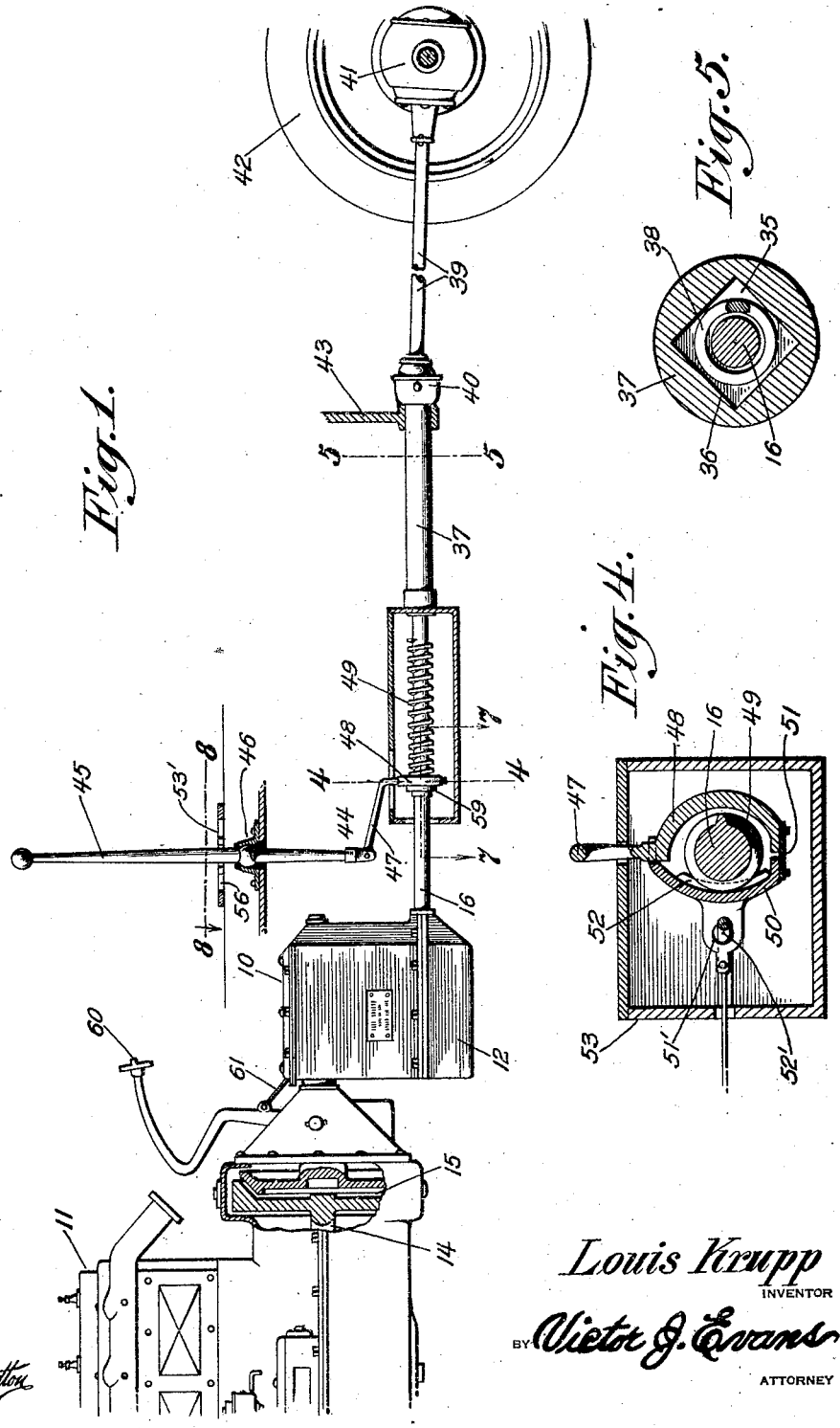

1,590,949

UNITED STATES PATENT OFFICE.

LOUIS KRUPP, OF NEW YORK, N. Y.

TRANSMISSION.

Application filed September 5, 1925. Serial No. 54,738.

This invention relates to improvements in transmissions and more particularly to that type of transmission used upon motor propelled vehicles.

The principal object of the invention is to provide a transmission for automobiles which will relieve the operator of the necessity of disengaging the clutch and shifting gears in order to change from low speed to high speed.

Another object resides in a transmission in which the respective gears are always in mesh, thus eliminating the clashing of the gears which occurs in the type of transmission in which one gear is moved into mesh with a second gear while one of the gears is in rotary motion.

A further object is to provide a transmission which will increase the driving power of a motor as the drive is direct and continuous from the motor shaft to the drive shaft.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is an elevational view of my improved transmission and showing its relative position with respect to the power unit of an automobile.

Figure 2 is an enlarged vertical sectional view through the transmission.

Figure 3 is an enlarged vertical sectional view on the line 3—3 of Figure 2.

Figure 4 is a detail sectional view on the line 4—4 of Figure 1.

Figure 5 is a similar view on the line 5—5 of Figure 1.

Figure 6 is an enlarged sectional view of the gear shifting mechanism.

Figure 7 is a sectional view on line 7—7 of Figure 1.

Figure 8 is a detail horizontal sectional view on the line 8—8 of Figure 1.

Figure 9 is a detail perspective view of the foot actuated releasing mechanism.

Referring more particularly to the drawings, the reference numeral 10 designates my improved transmission mechanism in its entirety and which is shown in Figure 1 of the drawings as operatively associated with an internal combustion engine 11.

My improved transmission 10 includes a housing 12 within which is journaled a driving or transmission shaft 13 disposed in axial alignment with the motor shaft 14 of the engine 11. A conventional type of clutch mechanism 15 is shown for operatively connecting the motor shaft 14 with the driving shaft 13 when power is desired to be transferred to the driven shaft 16. Fixed or keyed to the driving shaft 13 are spaced gears 17, 18 and 19 of different diameters and which constitute a series of gears A for constant meshing engagement with co-acting gears 20, 21 and 22 of varying diameters which have a common axis and constitute a second series of gears B. The gears 20, 21 and 22 are provided with hubs 23 which rotatably support the gears upon hollow or tubular bearings 25, certain of the bearings being mounted in the end walls of the housing 12 and the remainder of the bearings being stationarily supported by brackets extending from the side walls of the housing. The second series of gears B are further provided with central openings 26 of a diameter to align with the inner walls of the bearings 25, whereby a tubular passage is provided for the longitudinal movement of the driven shaft 16. Extending inwardly from the inner walls of the openings 26 are oppositely disposed lugs 27 for co-action with outwardly extending lugs 28 provided on one end of the driven shaft 16 as the shaft 16 is moved longitudinally into engagement with the lugs of the respective gear wheels. The series of gears A and B constitute the three forward speeds adapted to be transmitted to the driven shaft for propelling an automobile in a forward direction, and it might be here stated that the co-acting gears 17 and 20 constitute the "first speed" or "low gear", the gears 18 and 21 the "intermediate" or "second speed", and the gears 19 and 22 the "third speed" or "high gear". The co-acting gears are constantly in mesh and rotate simultaneously when the motor shaft 14 is clutched with the driven shaft 13.

Having described the forward speed, I shall now explain the parts which constitute the "reverse" speed and which is designated broadly by the letter C. The reverse comprises a gear 29 fixed or keyed to the driving shaft 13 which imparts a reverse turning movement to the gear 30 rotatably supported by certain of the tubular bearings 25, through an intermediate gear 31 fixed or keyed to a counter shaft 32 journaled within the housing 12. The gears 29, 30 and 31 are always in mesh and rotate when the shaft 13 is clutched with the engine shaft 14. The gear 30 is provided with a central opening 33, within which extend lugs 34, for co-acting engagement with the lugs 28 on the driven shaft, when the said shaft is moved rearwardly.

The rear end of the driven shaft 16 is provided with a squared head 35 which is slidable in a similarly shaped bore 36 of a sleeve 37. The forward end of the sleeve is closed and an expansible spring 38 in interposed between the head 35 and the forward closed end. The rear end of the sleeve is joined to a connecting shaft 39 by a universal joint 40 and which shaft extends into the differential housing 41 for imparting movement to the rear wheels 42 of a vehicle. The sleeve 37 is journaled within a portion of the chassis frame 43 of the vehicle as is the driven shaft 16.

For initially sliding the driven shaft in a forward direction for engagement with the gear 20 and for sliding the same rearwardly for engaging the gear 30, I provide a selective control means 44 which comprises a hand operated lever 45 mounted between its ends as at 46 for universal movement upon the frame of the vehicle. The lower end of the lever is pivotally connected with an arm 47 which carries a yoke 48 which partially surrounds the screw portion 49 and the driven shaft 16, but the said yoke does not directly engage said shaft. The lower end of the yoke is yieldingly connected with one end of a member 50 by means of a flat spring 51, which tends to normally hold the threads 52 on the inner side of the member in co-acting engagement with the screw 49. The top of the member is recessed to receive the arm 47 which prevents lateral movement of the member when in neutral position and when the lever has been moved to advance the driven shaft for obtaining forward speed. The member 50 is always in co-acting position with the screw of the shaft 16 with the exception of when the lever is moved to a reverse position, but when the lever 45 is moved to a reverse position, the member is disengaged from the screw 49. In order to disengage the member 50, the yoke 48 causes an eye 51' which extends from the member to engage an angularly disposed pin 52' which projects from a casing 53, which casing serves to enclose the threaded portion of the shaft and its co-acting parts. As the pin engages the walls of the eye 51', the member is swung outwardly beyond the path of the same, the member having pivotal movement at its point of connection with the flat spring 51. It will be seen that when the lever is moved to reverse position, the member 50 is out of engagement with the screw 49 while the lugs 28 of the driven shaft are in co-acting engagement with the lugs on the gear 30.

A rack plate 53' is stationarily mounted above the pivot point of the lever 45 and through which the upper end of the lever extends. The plate is provided with three notches 54, 55 and 56, and when the lever is moved into the notches the driven shaft is respectively in a "neutral", "forward" and "reverse" speed. A flat spring 57 secured to the lever tends to keep the same seated in the notches, but may be compressed when moving the lever from one notch to the other.

In operation, we shall presume that the lever 45 is in the notch 54, which is the "neutral" position and the clutch 15 is disengaged, while the lugs 28 on the driven shaft are free to rotate within the tubular bearing between the gear 20 and the gear 30. The lever is now moved and locked in the notch 55 of the plate, which movement causes the arm 47 and member 50 to slide the driven shaft 16 a predetermined distance in the direction of the arrow shown in Figure 2 of the drawing. The initial sliding movement of the shaft is only sufficient to cause the lugs 28 on the shaft to engage the lugs 27 on the first gear 20. The clutch is now engaged which rotatably connects the motor shaft 14 with the driving shaft 13, thus imparting movement to both series of gears A and B. As the gear 20 rotates, the driven shaft 16 will be automatically fed in a forward direction by reason of the screw 49 of the shaft engaging the threads on the stationary member 50. As the lugs 28 disengage the lugs 27 of the gear 20, they in turn engage the lugs 22 of the next gear 21 and at which time the transmission is driving in second speed. This continues until the end of the screw is reached by the member 50 at which time the transmission is driving in "high" or "first" speed. It will be seen that the gears are automatically and consequently engaged with the driven shaft 16 after the initial movement of the lever 45. As the shaft 16 is fed forward, the head 35 compresses the spring 38, and when the lever is moved back to "neutral" position, the spring will cause the shaft to move in an opposite direction. The shaft is thus given a reverse turning movement as the member 50 is still engaged with the screw and the rearward movement of the shaft is limited by a flange 59 provided at the forward end of the screw.

For "reverse" speed, the lever 45 is moved in to the notch 56, which shifts the driven shaft a predetermined distance in a rearward direction to cause the lugs 28 to engage the lugs on the gear 30 of the reverse gearing C. The member 50 is disengaged with the threads on the driven shaft when the lever reaches the limit of its movement to the reverse position the spring 38 automatically moves the shaft 16 the desired distance.

From the foregoing description, it will be seen that I have provided a transmission in which the necessity of engaging and disengaging the clutch when changing from one speed to another is eliminated, as the different speeds are automatically brought into operation after the initial movement of the lever 45.

For automatically returning the driven shaft 16 to neutral position when the brake pedal 60 is depressed when the car is brought to a stop, I attach one end of a cable 61 to the brake pedal, and the other end to the member 50, and pass the cable over pulleys 62. With reference to Figure 9 of the drawings, it will be seen that when the foot pedal is depressed, a pull will be exerted upon the cable, thus disengaging the threads on the member with the screw by swinging the same upon the spring hinge, thus allowing the spring 38 to return the driven shaft to neutral position irrespective of whether the transmission is in "low", "intermediate", or "high" speed.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a transmission mechanism, a driving shaft, sets of meshing gears of different ratios operable by said driving shaft, a slidable driven shaft, means for initially sliding said driven shaft into co-acting engagement with one of said sets of gears and automatic means for consecutively engaging said slidable driven shaft with the other respective sets of gears.

2. In a transmission mechanism, a driving shaft, sets of meshing gears of different ratios operable simultaneously in the same direction by said driving shaft, a slidable driven shaft, means for initially sliding said driven shaft into co-acting engagement with one of said sets of gears, automatic means for consecutively engaging said slidable driven shaft with said sets of gears upon longitudinal movement of said slidable driven shaft in one direction to cause the driven shaft to rotate in one direction at varying speeds, and means for imparting a reverse rotary movement to said slidable driven shaft upon longitudinal movement of said slidable driven shaft in an opposite direction.

3. In a transmission mechanism, a driving shaft, sets of meshing gears of different ratios simultaneously operable by said driving shaft, a slidable driven shaft, means for initially sliding said driven shaft into co-acting engagement with one of the sets of gears, and automatic means for feeding said driven shaft longitudinally into consecutive engagement with the other sets of gears.

4. In a transmission mechanism, a driving shaft, sets of meshing gears of different ratios simultaneously operable by said driving shaft, a slidable driven shaft, means for initially sliding said driven shaft into co-acting engagement with one of the sets of gears, automatic means for feeding said driven shaft longitudinally into consecutive engagement with the other sets of gears, and means operable for automatically disengaging said driven shaft from said sets of gears and for returning said driven shaft to normal position.

5. In a transmission mechanism, a driving shaft, driving gears of different diameters fixed to said shaft, driven gears of varying diameters in constant mesh with the respective driving gears, a slidable driven shaft disposed in alignment with the axis of said driven gears and movable therethrough, coacting means on said driven gears and said driven shaft engageable as the driven shaft is moved through said driven gears, means for imparting initial sliding movement to said driven shaft to engage one of the driven gears, and automatic means for sliding said driven shaft into consecutive engagement with the other driven gears.

6. In a transmission mechanisms, a driving shaft, driving gears of different diameters fixed to said shaft, driven gears of varying diameters in constant mesh with the respective driving gears, a slidable driven shaft disposed in alignment with the axis of said driven gears and movable therethrough, coacting means on said driven gears and said driven shaft engageable as the driven shaft is moved through said driven gears, means for imparting initial sliding movement to said driven shaft to engage one of the driven gears, and automatic means for sliding said driven shaft into consecutive engagement with the other driven gears, said last means including a screw provided on said slidable driven shaft co-acting with a part stationary with respect thereto.

7. In a transmission mechanism, a driving shaft, driving gears of different diameters fixed to said shaft, driven gears of varying diameters in constant mesh with the respective driving gears, a slidable driven shaft disposed in alignment with the axis of said driven gears and movable therethrough, co-acting means on said driven gears and said driven shaft engageable as the driven shaft is moved through said driven gears, means for imparting initial sliding movement to said driven shaft to engage one of the driven gears, automatic means for sliding said driven shaft into consecutive engagement with the other driven gears, said last means including a screw provided on said slidable driven shaft co-acting with a part stationary with respect thereto, and releasing means for automatically returning said driven shaft to its normal disengaging position.

8. In a transmission mechanism, the combination of the motor shaft, of an engine, a transmission shaft in axial alignment therewith, a clutch for rotatably connecting said motor shaft and said transmission shaft, a slidable driven shaft, a series of gears of varying diameters fixed to said transmission shaft, a corresponding series of gears of varying diameters mounted on tubular bearings and meshing with the respective gears of the first mentioned series, said second series of gears having openings in alignment with the tubular bearings, opposed lugs extending from the walls of said openings, opposed lugs on one end of said slidable driven shaft for co-acting engagement successively with the lugs of said gears, means for initially sliding said driven shaft into co-acting engagement with one of said second series of gears, and automatic means operable upon engagement of said driven shaft with one of said second series of gears for imparting a further sliding movement to said driven shaft to consecutively engage the other of the second series of gears.

9. In a transmission mechanism, a driving shaft, driving gears of different diameters fixed to said shaft, driven gears of varying diameters in constant mesh with the respective driving gears, a slidable driven shaft disposed in alignment with the axis of said driven gears and movable therethrough, co-acting means on said driven gears and said driven shaft engageable as the driven shaft is moved through said driven gears, means for imparting initial sliding movement to said driven shaft to engage one of the driven gears, and automatic means for sliding said driven shaft into consecutive engagement with the other driven gears, and foot actuated releasing means for automatically returning said driven shaft to normal position after the actuation of said automatic means.

In testimony whereof I have affixed my signature.

LOUIS KRUPP.